United States Patent Office 3,281,156
Patented Oct. 25, 1966

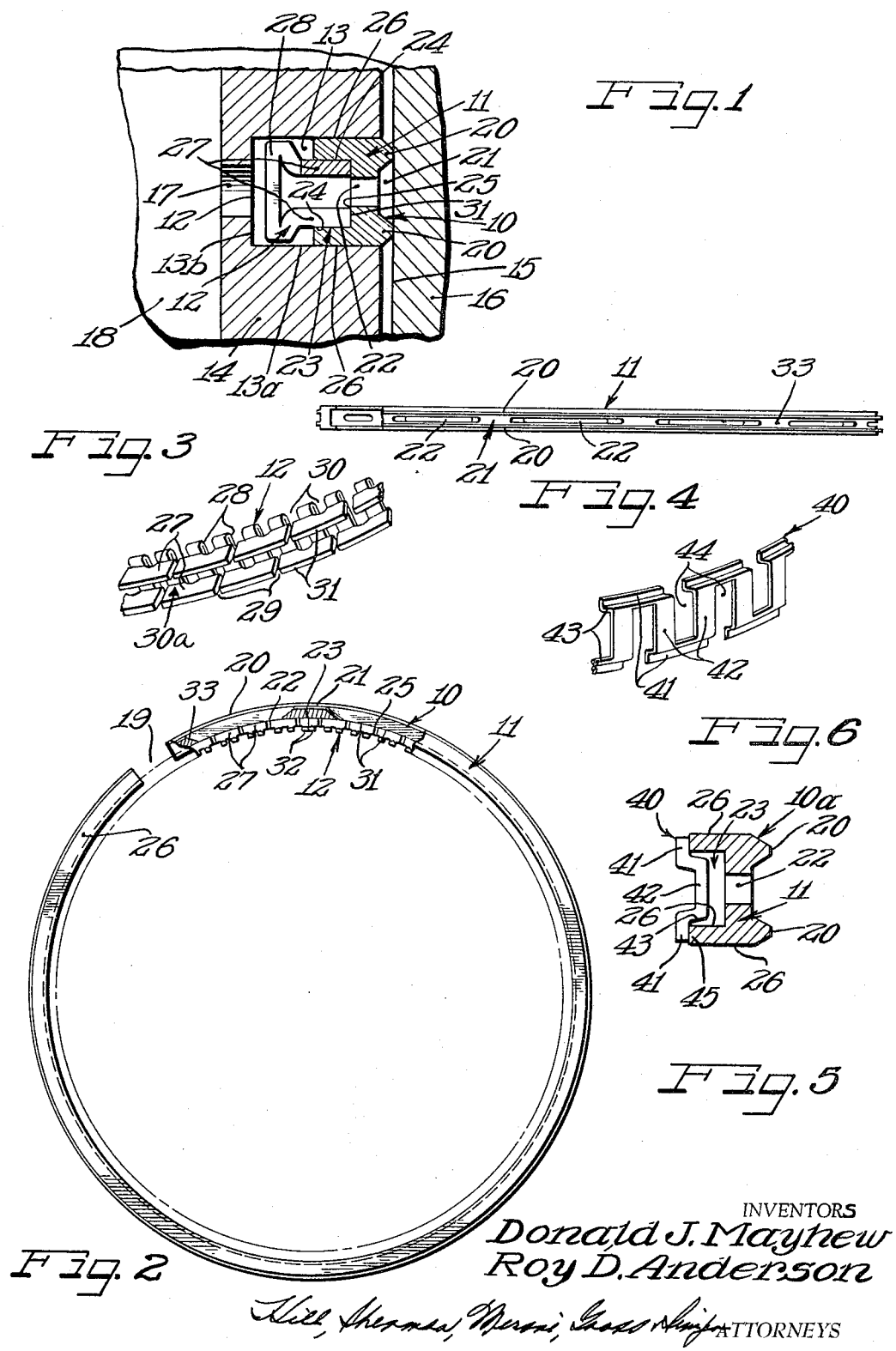

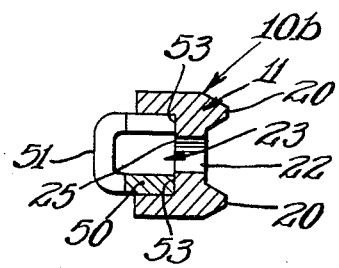
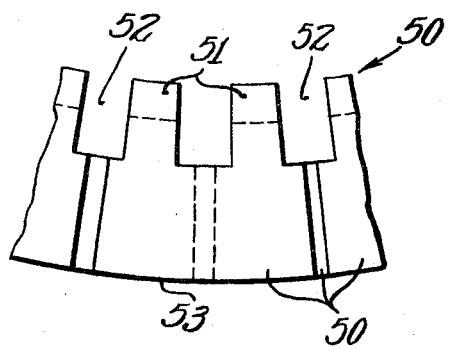
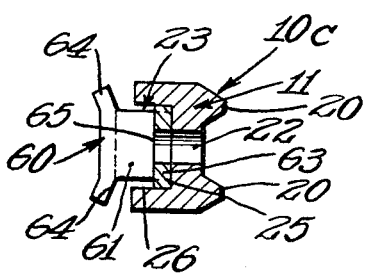
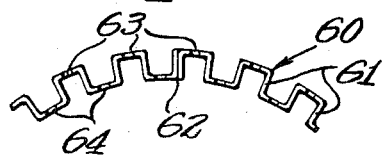
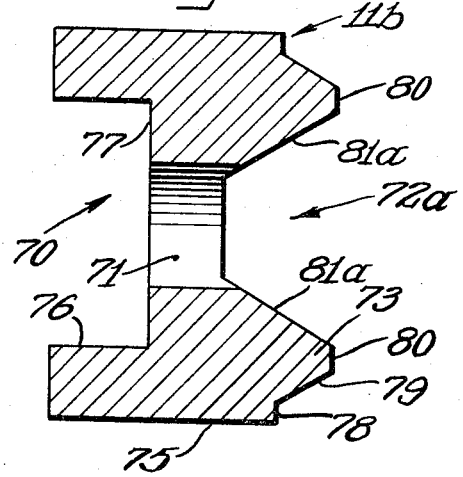

3,281,156
PISTON RING ASSEMBLY
Donald J. Mayhew, Manchester, and Roy D. Anderson, Ballwin, Mo., assignors to Ramsey Corporation, St. Louis, Mo., a corporation of Ohio
Filed Dec. 12, 1963, Ser. No. 330,134
3 Claims. (Cl. 277—140)

This invention relates to a piston ring and expander assembly having excellent conformability with the bore or cylinder wall of an engine and more specifically deals with a two component oil ring assembly suited for heavy duty engine applications and possessing a high degree of flexibility.

The present invention will hereinafter be specifically described as embodied in an oil control ring for the pistons of internal combustion engines, but it will be understood that the principles of this invention are generally applicable to packing rings and therefore the scope of the invention is not limited to the specifically described embodiments.

Oil ring assemblies for pistons of internal combustion engines have heretofore been composed of a single ring backed by an expander which is bottomed in the piston ring groove or of a pair of thin rail rings supported on a spacer-expander which did not have to be bottomed in the groove of the piston. The expander backed single ring assembly is quite rigid and only engages the grooves bottomed expander at several widely spaced circumferential points thereby preventing uniform loading and good bore conformability. The pair of rail rings, and spacer-expander assemblies, being composed of at least three components, is difficult to install, and often has the rails thereof acting independently to flip back and forth creating a paint brushing action which is detrimental to good oil control.

Therefore, the scraping edge of the rail ring must be rounded to prevent bore damage as the rails flip back and forth and efficient sharp scraping edges are not available in these rail ring assemblies. Further, the rail rings must have an appreciable radial width to be retained in the ring groove and to permit manufacture by coiling. They cannot have the radial flexibility of shallow rings and thus these assemblies do not have a high degree of conformability.

The present invention now avoids the deficiencies of heretofore available two piece and three piece oil ring assemblies by providing a channel shaped oil ring receiving in the channel thereof an expander ring which exerts its expanding force around the entire circumference of the oil ring in substantially continuous circumferential contact therewith. The channel oil rings of this invention are quite shallow in radial depth and the expander rings are of the circumferentially expansion or garter spring type which need not bottom in the ring groove of the piston. The entire assembly is thus very flexible and quickly conforms to the bore of the cylinder for exerting uniform radial pressure on the cylinder wall.

The channel oil ring has a plurality of axially spaced peripheral scraping edges which can be designed to efficiently scrape the cylinder wall because the ring cannot flip back and forth and the several sets of scraping edges are fixed relative to each other. This channel oil ring also has a very open drainage path between the scraping edges and the expander ring in the channel has a high capacity darinage area around the entire circumference thereof to produce a non-clogging high drainage capacity oil flow channel from the scraping edges to the drainage holes in the piston ring groove. Since the one piece oil ring receives the one piece expander ring in the channel thereof the assembly is easily installed as a unit and automatic installing equipment can be used which was heretofore not available for use with the three piece rail ring assemblies or the prior known groove bottomed expander backed oil rings.

It is then an object of this invention to provide a highly flexible expander-piston ring assembly which maintains uniform radial pressure on a cylinder wall.

Another object of this invention is to provide a two piece expander-oil ring assembly which is very flexible in a radial direction.

Another object of this invention is to provide a channel-shaped oil ring with a plurality of scraping edges directing oil into the channel and with an open garter spring type expander seated in the channel to exert a substantially continuous circumferential expansion around the entire ring.

Another object of this invention is to provide a two piece oil ring assembly with an expander that does not have to be bottomed on the oil ring groove of the piston.

A still further object of this invention is to provide an oil ring with a plurality of axially spaced scraping edges in fixed relation to each other and having an open channel between the edges to receive oil therefrom and to provide a seat for a garter spring type expander.

Another object of this invention is to provide a two component oil ring unit which can be installed in a piston ring groove with automatic machinery.

Another object of this invention is to provide an oil ring for pistons including a one piece outer ring with a pluralty of circumferential scraping edges and an inwardly opening channel between the scraping edges receiving a channel type expander ring with the side legs of the expander ring exerting a substantially continuous expanding force around the entire periphery of the oil ring.

Other and further objects of this invention will be apparent to those skilled in this art from the following detailed description of the annexed sheets of drawings which show several embodiments of the invention.

On the drawings:

FIGURE 1 is a fragmentary vertical cross sectional view of a piston and cylinder assembly equipped with an oil ring assembly of this invention.

FIGURE 2 is a plan view of the oil ring assembly of FIGURE 1 with parts broken away to show underlying parts.

FIGURE 3 is a fragmentary isometric view of the expander ring of the assembly of FIGURES 1 and 2.

FIGURE 4 is a side elevational view of the oil ring of the assembly of FIGURES 1 and 2 with a part broken away to show an underlying portion.

FIGURE 5 is a transverse cross sectional view of another oil ring assembly according to this invention.

FIGURE 6 is a view similar to FIGURE 3 but illustrating the expander for the assembly of FIGURE 5.

FIGURE 7 is a transverse cross sectional view of a further modified form of oil ring assembly according to this invention.

FIGURE 8 is a fragmentary plan view of the expander in the assembly of FIGURE 7.

FIGURE 9 is a transverse cross sectional view similar to FIGURES 5 and 7 but illustrating another form of assembly of this invention.

FIGURE 10 is a fragmentary plan view of the expander in the assembly of FIGURE 9.

FIGURE 11 is an enlarged vertical cross section of a modified oil ring of this invention.

FIGURE 12 is a greatly enlarged cross section of a still further modified oil ring of this invention.

As shown on the drawings:

In FIGS. 1 and 2 the reference numeral 10 designates a piston ring assembly of this invention including a one piece oil ring 11 and a one piece garter spring type expander ring 12. The assembly 10 is illustrated in FIG. 1 as mounted in the oil ring groove 13 of an internal combustion engine piston 14 operating in the bore 15 of an engine cylinder 16. It will of course be appreciated that the pistion 14 is equipped with the conventional top ring grooves above the oil ring groove 13. The oil ring groove 13 drains through conventional drainage or smoke holes 17 to the interior 18 of the piston.

The oil ring 11 may be a cast iron or a steel ring and may be plain or coated with hard facing metals such as molybdenum or chromium. The ring 11 is split and as shown in FIG. 2, in its free state, a gap 19 is provided between the split ends thereof which gap of course is decreased to a very narrow slit when the ring is compressed into the bore 15.

The ring 11 has a pair of axially spaced protruding beads or rims 20 therearound each providing a sharp scraping edge engaging the bore wall 15. An open continuous groove 21 is provided around the ring between these beads 20 and the bottom of this groove is provided with a plurality of closely spaced circumferentially elongated openings or slots 22 joining the groove with a substantially rectangular channel 23 around the inner periphery of the ring. The channel 23 has flat radial side walls 24 and an axial back wall 25 at right angle relation thereto.

The ring 11 has flat top and bottom faces 26 slidably and sealingly engaging the side wall 13a of the piston ring groove 13 and the radial dimension of the ring is quite shallow so that it only fills the outer portion of the ring groove. The beads or rims 20 project beyond the ring groove to span the gap between the piston and the bore for scraping against the bore wall.

The expander 12 is of the garter spring circumferentially expanding type which does not bottom on the bottom 13b of the ring groove for obtaining its expanding force. The expander ring 12 as shown in FIG. 3 is composed of spring steel with top and bottom rows of circumferentially spaced arcuate segments or legs 27 connected by circumferentially spaced upstanding fingers 28. As shown these fingers are disposed around the inner periphery of the ring 12 and the top and bottom rows of segments are in staggered relation so that the segment of one row is connected to an adjacent segment in the other row by a finger. The segments 27 have gaps or slots 29 therebetween, the fingers 28 have open spaces 30 therebetween and the top and bottom rows of segments 27 provide a wide open channel 30a therebetween. When the ring 12 is circumferentially compressed to decrease the free state widths of the slots 29 the ring exerts a uniform radial expansion force around the entire periphery thereof.

Each segment 27 has an outer peripheral edge 31 to transmit this radial expansion force.

As shown in FIG. 1 the segments 27 are seated in the channel 23 of the ring 11 on the side wall 24 thereof and their peripheral edges 31 are bottomed on the end wall 25 of this channel. The legs 28 fit freely in the ring groove 13 in spaced relation inwardly from the side walls 13a thereof and outwardly from the bottom wall 13b thereof.

As shown in FIG. 2 the ring 12 is split and when assembled the ends 32 thereof are abutted together in the channel 23 of the ring 11. As also shown in FIG. 2 the radial force transmitting peripheral edges 31 of the ring 12 form a substantially continuous contact with the back or bottom wall 25 of the channel of the ring 11 around the entire periphery of this ring.

Since in effect, the only solid areas of the ring 11 between the beads or rims 20 thereof are those legs or lands 33 between the slots 22, the ring 11 has a very open oil drainage path between the scraping edges into the channel 23. The expander 12 also has a wide open flow path therethrough provided by the open channel between the segments and the spaces between the fingers. As a result oil scraped from the bore wall 15 can flow freely between the scraping edges of the ring to the drain holes 17 of the ring groove.

Since the segments 27 of the ring 12 fit in the channel 23 of the ring 11 a unitary easily installed assembly is provided which does not require bottoming or centering in the piston groove 13 because the parts are preassembled for operation. The scraping edges provided by the rim 20 are fixed relative to each other and sliding contact of the flat faces 26 of the ring on the flat side walls 13a of the ring groove prevent cocking or rocking of the edges. The ring 11 can be made very shallow in a radial dimension so as to have extremely high flexibility and conformability with the bore wall 15 and the substantially continuous circumferential contact between the radial expansion force transmitting edges 31 of the ring segments 27 with the bottom wall 25 of the channel 23 insure uniform loading of the ring 11.

In a modified assembly 10a of FIG. 5 the same oil ring 11 described above is provided but the channel 23 thereof receives a modified expansion ring 40 shown in FIG. 6. The ring 40 includes top and bottom rows of circumferentially spaced upstanding segments 41 connected by spring fingers or legs 42 that are forwardly offset from the segments 41 by means of shoulders or ledges 43. The spring finger 42 at the end of one segment 41 in one row of segments is connected to the spring finger 41 in the other row of segments and as a result a garter spring type of expansion ring is provided with a large open area 44 for oil drainage. As shown in FIG. 5 the segments 41 are bottomed on the inner peripheral wall 45 of the ring 11 with the legs 42 projected freely into the channel 23 but with the shoulders 43 spaced from the side walls 26 of the channel. As in the case of the assembly 10 the expansion ring of the assembly 10a has a substantially continuous circumferential contact with the oil ring at two points. Whereas in FIG. 1 the two point contact was obtained at the back or bottom wall 25 of the channel 23, the two point contact in the assembly of FIG. 6 is obtained at the inner wall 45 of the ring at the inner end of the channel.

In the modification 10b of FIG. 7 the same oil ring 11 described in the embodiments 10 and 10a is provided but a different expander 50 is used which is more fully shown in FIG. 8. The expander 50 is a spring steel channel with top and bottom rows of circumferentially spaced segments 50 connected in staggered relation by vertical legs 51 around the inner periphery of the ring which are separated by relatively wide gaps or spaces 52. As in the case of the expanders 12 and 40, the expander 50 has the legs 51 connecting adjoining top and bottom segments 50 in staggered relation to form a garter spring. The segments 50 fit in the channel 23 of the oil ring 11 and have their peripheral edges 53 bottomed on the back end wall 25 of the channel 23. The open gaps 52 between the legs 51 accommodate free drainage of oil back to the interior of the piston.

In the still further embodiment 10c of FIG. 9 the same oil ring 11 is provided but the expander 60 is corrugated as best shown in FIG. 10. This expander 60 is a ring of spring steel with radially corrugated U-shaped sections 61 alternately opening inwardly and outwardly and with the end legs 62 of the sections in abutted together relation to form a circumferentially expanding and contracting spring. The outer ends of the U-shaped sections 61 have upstanding legs 63 thereon of a height sized to slide freely on the legs 26 of the oil ring channel 23. These upstanding ends 63 are bottomed on the back wall 25 of the channel 23.

The inner periphery of the ring has upstanding tabs 64 on the U sections which fit freely in the piston ring groove.

As in the case of the embodiments 10 and 10b the expander 60 acts on the back end of the channel 26 and free drainage of oil scraped from the cylinder wall by the scraping edges 20 of the oil ring 11 is accommodated in the open spaces provided at the tops and the bottoms of the U-shaped segments 61 which, as shown in FIG. 9, are inwardly from the side legs 26 of the channel 23. Further, holes 65 are provided through the legs 63 for registration with the holes or slots 22 in the oil ring.

The assembly 10c of FIG. 9 operates in the same manner as the assemblies 10 and 10b with the radial expansion load applied to the oil ring 11 at the back end of its channel by the legs 63.

In FIG. 11 there is illustrated a modified oil ring 11a. This ring like the ring 11 has an inwardly opening circumferential channel 70 connected through slots 71 with a groove 72 around the entire periphery of the ring and positioned between scraping rims or beads 73. The outer periphery of the ring however is coated with a hard facing material 74 of molybdenum, chromium, or the like.

The ring 11a has flat top and bottom faces 75 for slidable engagement with the sides of the piston groove and the channel 70 has flat radially extending side legs 76 and an axial end wall 77. The outer periphery of the ring 11a has axial shoulders 78 extending inwardly from the end faces 75 in right angle relation thereto and terminating at radially outward and axially inward sloping bead walls 79 of the scraping edges. The scraping edges themselves are vertical or axial as illustrated at 80 and extend to the groove 72 which, as shown at 81, has a rounded or dished base.

In FIGURE 12, a further modified oil ring 11b has parts thereof corresponding to identical parts in the oil ring 11a marked with the same reference numerals. In the ring of FIGURE 12 however the hard face coating is eliminated and the scraping edges 80 extend to conically tapered walls 81a forming the sides of the groove 72a. These walls converge to the slots 71 connecting the groove 72a with the channel 70. The peripheral groove 72a therefore is generally U-shaped in cross section as contrasted with the groove 72 of the ring 11a which has a rounded base. The scraping edges 80 on the bead rims 73 are at the converged ends of the sloping walls 70 and 81a of the beads.

The oil rings 11, 11a and 11b each include a rectangular channel in the inner diameter of the ring extending completely around the ring and opening inwardly. This permits various types of circumferential expanders to induce radially expanding force around the entire periphery of the oil ring. The expanding force can be induced at two land contact areas in the bottom of the channel or against the inner ends of the channel legs around the inner periphery of the oil ring. Further, the circumferential expanders can have single full land contact with either the bottom or the inner end of the channel. Uniform pressure around the entire periphery of the oil ring is therefore maintained and since the oil ring is rather shallow in radial depth and has great flexibility, it will quick adapt itself to any bore irregularities and will maintain good sealing contact with the cylinder wall.

The ring assemblies of this invention have excellent oil drainage. Since the expanding force is maintained around the entire periphery of the ring and is substantially continuous except for slight gaps between the expander ring segments, low unit loading pressure can be maintained without loss of sealing pressure. Reduced friction between the expander and the oil ring can be maintained by machine grinding the contacting surfaces of the expander and oil ring.

Although various minor modifications might be suggested by those versed in the art, it should be understood that we wish to embody within the scope of the patent granted hereon all such embodiments as reasonably and properly come within the scope of our contribution to the art.

We claim as our invention:

1. An oil control ring assembly for engine pistons having a degree of radial flexibility to quickly conform with an engine cylinder which comprises a one-piece outer split metal ring having a pair of flat radial faces and a single inwardly facing rectangular channel around the inner periphery thereof and between said radial faces, an outer facing groove around the outer periphery thereof, flat scraping edges at the sides of said groove and connecting slots through the ring joining the groove and channel in free flow communication, and a spring expander ring of U-shaped cross section with an outer opening channel bounded by legs slidably seated within the confines of the channel of the outer ring and having upstanding expansion fingers acting on said legs to exert a radial expansion force on the outer ring uniformly around the entire periphery thereof.

2. An oil control ring assembly for internal combustion engine pistons which comprises a one-piece split metal oil ring of shallow radial depth having a pair of flat spaced radial faces for slidably engaging the outer peripheral portion of the side walls of a piston ring groove, radially projecting axially spaced flat beads on the outer periphery of said oil ring defining scraping edges for engaging the bore of an engine cylinder, said oil ring having an outer peripheral groove completely therearound between said beads for receiving oil scraped from the engine cylinder by said scraping edges, said oil ring having a single inwardly opening rectangular channel around the inner periphery thereof and between said radial faces, elongated slots through said oil ring connecting the back wall of said channel with the bottom of said peripheral groove, and a spring steel expander ring of U-shaped cross section having the legs of the U situated within said channel and abutting the side walls and the back wall of the channel to exert two point expanding force around the periphery of said channel, said expander ring having upstanding spring fingers situated radially inward from said oil ring exerting radial expansion forces on said legs.

3. An oil control ring assembly which comprises a one piece metal split ring having flat ring groove engaging faces and having a pair of flat radial faces, a pair of axially spaced circumferential flat rims on said ring projecting outwardly from the periphery thereof, said ring having a continuous outwardly opening peripheral groove between said rims, said ring having an inwardly opening channel around the entire inner periphery thereof and between said radial faces, said ring having slots therethrough connecting the back wall of the channel with the bottom of the peripheral groove, and a steel expander ring of U-shaped cross-section having the legs of the U situated within the confines of said channel and bottom on said back wall of the channel and having upstanding expansion fingers acting on said legs to exert a radial expansion force on the outer ring uniformly around the entire periphery thereof.

References Cited by the Examiner

UNITED STATES PATENTS

| | | | |
|---|---|---|---|
| 1,708,816 | 4/1929 | Williams | 277—160 X |
| 1,840,935 | 1/1932 | Curtis | 277—160 |
| 1,903,107 | 3/1933 | Grant | 277—160 |
| 2,742,334 | 4/1956 | Phillips | 277—139 |
| 2,891,831 | 6/1959 | Baker | 267—1.5 X |
| 2,938,758 | 5/1960 | Phillips | 277—231 X |
| 2,940,803 | 6/1960 | Phillips | 277—231 X |
| 3,066,943 | 12/1962 | Brenneke | 277—139 |
| 3,191,946 | 6/1965 | Hamm | 277—138 |

FOREIGN PATENTS 511,623    4/1955    Canada.

LAVERNE D. GEIGER, *Primary Examiner.*

J. MEDNICK, *Assistant Examiner.*